(12) United States Patent
Aksit et al.

(10) Patent No.: US 6,669,202 B1
(45) Date of Patent: Dec. 30, 2003

(54) MULTI-CORE BRUSH SEAL ASSEMBLY FOR ROTARY MACHINES

(75) Inventors: Mahmut Faruk Aksit, Instanbul (TR); Robert Russell Mayer, Manchester, CT (US); Wei Tong, Clifton Park, NY (US); Osman Saim Dinc, Troy, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 10/184,179

(22) Filed: Jun. 27, 2002

(51) Int. Cl.$^7$ ................................................. F16J 15/44
(52) U.S. Cl. ......................................................... 277/355
(58) Field of Search ........................................... 277/355

(56) References Cited

U.S. PATENT DOCUMENTS

| | | | |
|---|---|---|---|
| 1,596,422 A | * 8/1926 | Fulton | 277/355 |
| 2,349,643 A | * 5/1944 | Wesemeyer | 15/182 |
| 4,600,202 A | 7/1986 | Schaeffler et al. | |
| 4,733,225 A | 3/1988 | Uematsu et al. | |
| 5,066,024 A | * 11/1991 | Reisinger et al. | 277/355 |
| 5,474,306 A | 12/1995 | Bagepalli et al. | |
| 5,480,165 A | 1/1996 | Flower | |
| 5,509,669 A | 4/1996 | Wolfe et al. | |
| 5,915,697 A | 6/1999 | Bagepalli et al. | |
| 5,934,687 A | 8/1999 | Bagepalli et al. | |
| 5,961,125 A | 10/1999 | Wolfe et al. | |
| 5,975,535 A | 11/1999 | Gail et al. | |
| 6,010,132 A | 1/2000 | Bagepalli et al. | |
| 6,042,119 A | 3/2000 | Bagepalli et al. | |
| 6,162,014 A | 12/2000 | Bagepalli et al. | |
| 6,257,586 B1 | 7/2001 | Skinner et al. | |
| 6,257,588 B1 | * 7/2001 | Bagepalli et al. | |
| 6,340,286 B1 | 1/2002 | Aksit et al. | |

* cited by examiner

Primary Examiner—Anthony Knight
Assistant Examiner—E Peavey
(74) Attorney, Agent, or Firm—Armstrong Teasdale LLP; Robert B. Reeser, III

(57) ABSTRACT

A brush seal assembly that in an exemplary embodiment includes an elongate brush core holder, at least three elongate brush core packs bundled together side-by-side in the brush core holder forming a single assembly. Each brush core pack includes a bristle holder and a plurality of bristles coupled to the bristle holder.

28 Claims, 4 Drawing Sheets

MULTI-CORE BRUSH SEAL ASSEMBLY FOR ROTARY MACHINES

BACKGROUND OF THE INVENTION

This invention relates generally to seals, and more particularly, to a brush seal assembly for rotary machines.

Rotary machines include, without limitation, turbines for steam turbines and compressors and turbines for gas turbines and generators. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been used between a rotor and a surrounding casing in gas and steam turbines. A gas or steam turbine brush seal is made up of circumferentially-arrayed brush seal segments. Each brush seal segment includes a plurality of flexible, metal-wire bristles attached to (e.g., welded to) a metal bristle holder which has a shape of an annular segment of a circular ring. The bristle holder has a fixed radius and a fixed circumferential length corresponding to the radius and circumferential length of the surface groove of the annular casing segment into which the bristle holder, with attached bristles, is inserted. The bristle holder may include a backing plate positioned between the bristles and the lower-pressure side of the seal with the free ends of the bristles radially-inwardly-extending beyond the radially-inward end of the backing plate.

Metal brush seals are expensive and can generate excessive heat which precludes their use for oil sealing applications. Nonmetallic brush seals using micro-filaments made from yarns can be used in some applications. However, due to the very small filament diameter and very small width of the brush seals (about 0.05 inches), these seals can be used only in low pressure applications.

BRIEF DESCRIPTION OF THE INVENTION

In one aspect, a brush seal assembly is provided that includes an elongate brush core holder, at least three elongate brush core packs bundled together side-by-side in the brush core holder forming a single assembly. Each brush core pack includes a bristle holder and a plurality of bristles coupled to the bristle holder.

In another aspect, a rotary machine is provided that includes a rotor having a longitudinal axis, and a plurality of stator casing segments circumferentially arrayed together to define a stator casing which is generally coaxially aligned with the longitudinal axis and which circumferentially surrounds and is radially spaced apart from the rotor. The rotary machine also includes at least one brush seal assembly that includes an elongate brush core holder, at least three elongate brush core packs bundled together side-by-side in the brush core holder forming a single assembly. Each brush core pack includes a bristle holder and a plurality of bristles coupled to the bristle holder.

In another aspect, a brush seal assembly is provided that includes an elongate brush core holder, at least three elongate brush core packs bundled together side-by-side in a staggered arrangement in the brush core holder. Each brush core pack includes a bristle holder and a plurality of bristles coupled to the bristle holder.

DETAILED DESCRIPTION OF THE INVENTION

A rotary machine that includes a brush seal assembly in accordance with an embodiment of the present invention is described in detail below. The brush seal assembly is formed from multiple brush core packs arranged to achieve an extra wide packing thickness of the brush seal using micro-filaments. The brush seal assembly provides a low leakage of micro-fiber brush seals and a relatively high pressure load capability. A large packing width provides for low leakage rates of the seal which permits the brush seal assembly to be used in sealing lethal substances. Further, the brush seal assembly does not generate sparks during operation, and is non-conductive permitting use in explosive gas sealing, for example, hydrogen sealing in industrial generators.

Figure 1:
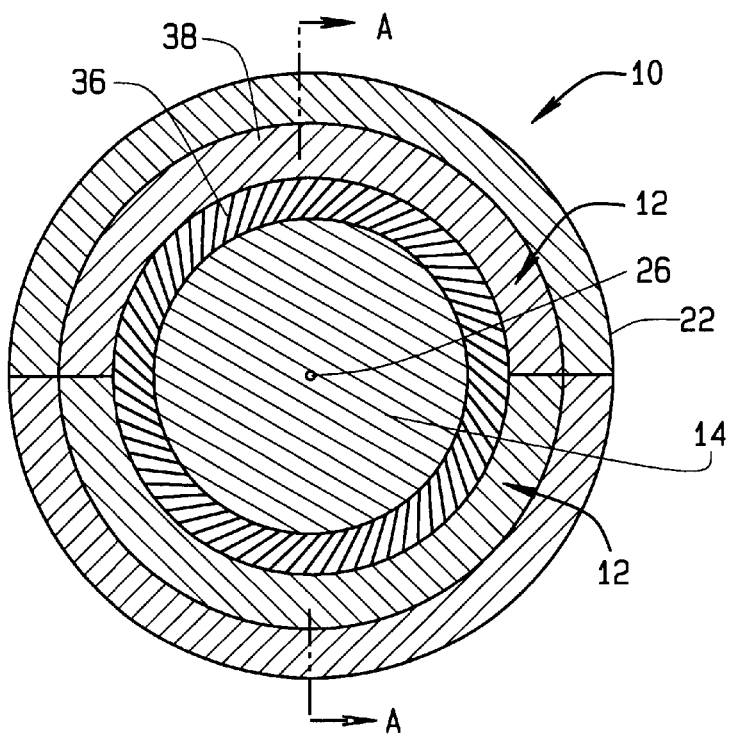
FIG. 1 is a schematic cross-sectional view of a rotary machine and of a brush seal assembly in accordance with an embodiment of the present.
Figure 2:
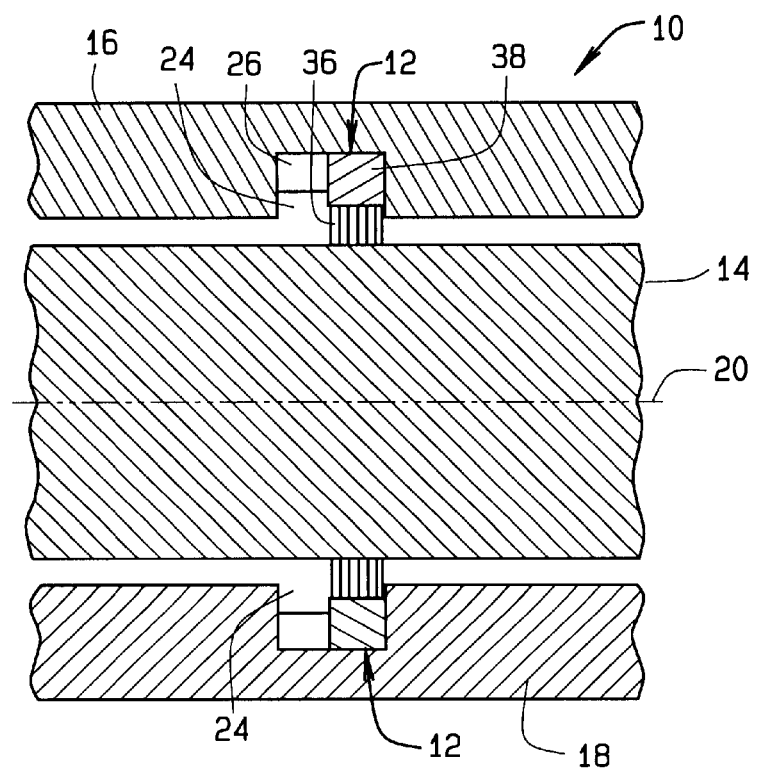
FIG. 2 is a schematic cross-sectional view along lines A—A of the rotary machine and the brush seal assembly shown in FIG. 1.

Referring to the drawings, FIG. 1 is a schematic cross-sectional view of a rotary machine 10 and of a brush seal assembly 12 in accordance with an exemplary embodiment of the present invention, and FIG. 2 is a schematic cross-sectional view along lines A—A of rotary machine 10. Rotary machines include, but are not limited to, an electric generator, or a high, medium, or low pressure turbine of a steam turbine, or a compressor or turbine section of a gas turbine. Rotary machine 10 includes a rotor 14, stator casing segments 16 and 18, and a plurality of brush seal assemblies 12. In another embodiment, rotary machine 10 includes one brush seal assembly. Rotor 14 has a longitudinal axis 20. Stator casing segments 16 and 18, as shown in FIG. 1, are circumferentially arrayed together to define a stator casing 22 which is generally coaxially aligned with the longitudinal axis 20 and which circumferentially surrounds and is radially spaced apart from rotor 14. Stator casing segments 16 and 18 each have a surface groove 24 which together define a circumferential channel which is generally coaxially aligned with longitudinal axis 20 and which is open to rotor 14. In one alternate embodiment, stator casing 22 is formed from one stator casing segment 16, and in another alternate embodiment, stator casing 22 is formed from more than two stator casing segments 16. In the exemplary embodiment, a spacer 26 secure brush seal assemblies 12 in surface groove 24 of the stator casing segments 16 and 18. In alternate embodiments, stator casing 22 does not include a surface groove and brush seal assembly 12 is coupled to stator casing 22 by other suitable methods, for example, by fasteners, by adhesives, by clips, and a combination thereof.

Figure 3:
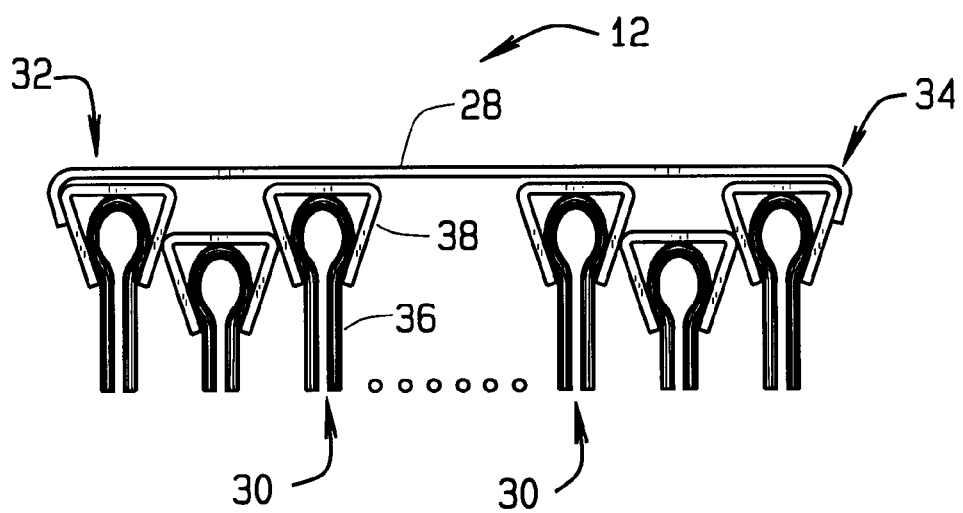
FIG. 3 is an enlarged cross-sectional view of the brush seal assembly shown in FIG. 1.

Referring to FIG. 3, brush seal assembly 12 includes an elongate brush core holder 28 and a plurality of brush core packs 30. Brush core holder 28 bundles brush core packs 30 together to form a single assembly 12. Brush core holder 28 has a first side 32 and a second side 34. Brush core packs 30 are bundled together in holder 28 in a side-by-side arrangement that extends from first side 32 to second side 34 of brush core holder 28. Each brush core pack 30 includes a plurality of bristles 36 extending from a base portion 38. In the exemplary embodiment, brush core packs are arranged in a staggered or off-set arrangement where base portion 38 of brush core pack 30 positioned immediately adjacent first side 32 of holder 28 is off-set from base portion 38 of the immediately adjacent brush core pack 30, which is in turn off-set from the next immediately adjacent brush core pack 30, and so on across the width of holder 28, as shown in FIG. 3. In an alternate embodiment, brush core packs 30 are arranged so that base portions 38 are not off-set from each other. In other alternate embodiments, brush core packs 30 are arranged in groups with base portions 38 of packs 30 in the group are arranged with no off-set and base portions 38 of a group of brush core packs 30 are off-set from base portions 38 an adjacent group of core packs 30.

Figure 4:
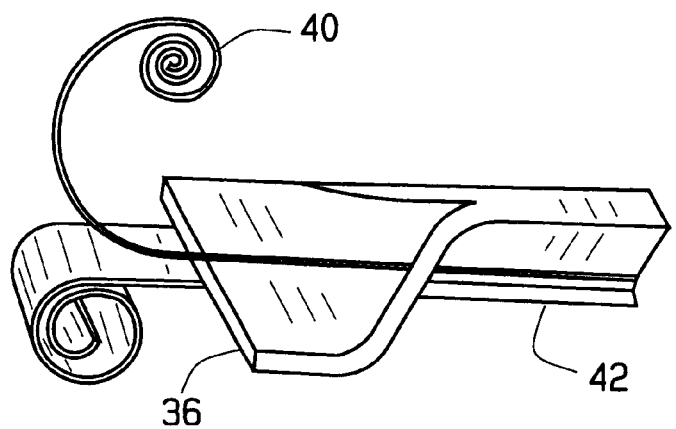
FIG. 4 is a side perspective view of a brush core pack shown in FIG. 3.
Figure 5:
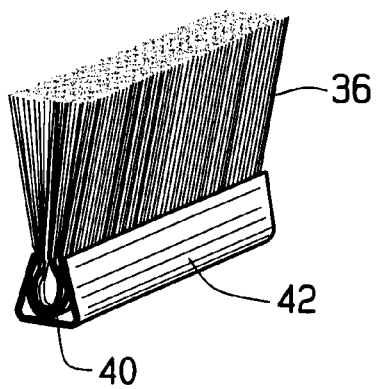
FIG. 5 is an end perspective view of a brush core pack shown in FIG. 3.

Brush core packs 30 are fabricated by any suitable brush manufacturing process. For example, in the exemplary embodiment, as shown in FIGS. 4 and 5, brush core packs 30 are fabricated by wrapping bristles 36 around a core wire 40 and clamping bristles 36 in place with a bristle holder or clamp 42. This brush core fabrication method is known and is common practice among brush manufacturers. In an alternate embodiment one end of bristles 36 are fixedly attached to bristle holder 42. Bristles 36 can be formed from any suitable material, for example, textile yarn filaments, plastic filaments, ceramic filaments and carbon fiber filaments. In an alternate embodiment, bristles 36 are replaced by a woven cloth. In the exemplary embodiment, bristles 36 are formed from micro-filaments, however, in other embodiments, larger filaments can be used.

In one embodiment, the width of multi-core brush seal assembly 12 is about 0.05 inch to about 1.0 inch. In another embodiment, the width of brush seal assembly is about 0.05 to about 0.8 inch, and in still another embodiment, about 0.05 inch to about 0.1 inch.

Figure 6:
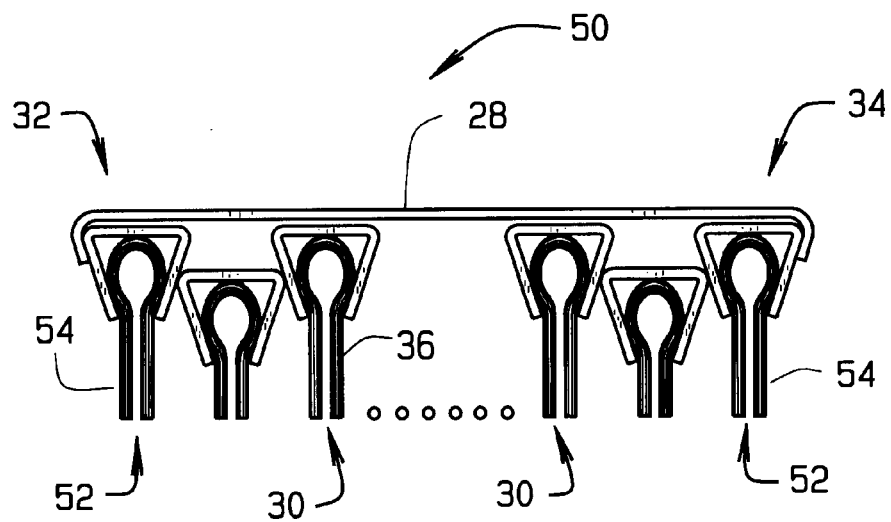
FIG. 6 is an enlarged cross-sectional view of a brush seal assembly in accordance with an embodiment of the present invention.

FIG. 6 is an enlarged cross-sectional view of a brush seal assembly 50 in accordance with another embodiment of the present invention. Brush seal assembly 50 includes brush core packs 52 positioned adjacent first and second side 32 and 34 of brush core holder 28 that include bristles 54 formed from a different material than bristles 36 of the remaining brush core packs 30 of assembly 50. Brush seal assembly 50 is useful in highly turbulent and aggressive applications where bristles 54 of core packs 52 are subject to turbulence. For example, in one embodiment, bristles 54 have stiffer or larger diameter filaments than bristles 36 of brush core packs 30. In another embodiment, brush core packs 52 include bristles 54 made from a different material than bristles 36 of core packs 30.

Figure 7:
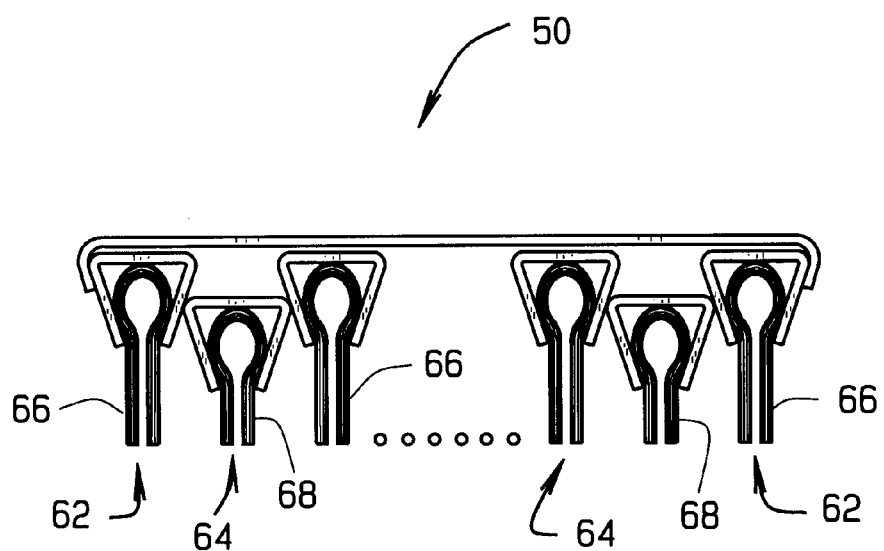
FIG. 7 is an enlarged cross-sectional view of a brush seal assembly in accordance with an embodiment of the present invention.

FIG. 7 is an enlarged cross-sectional view of a brush seal assembly 60 in accordance with another embodiment of the present invention. Brush seal assembly 60 includes a plurality of alternating brush core packs 62 and 64. In one embodiment, brush core packs 62 include bristles 66 made from a different material than bristles 68 of core packs 64. In another embodiment, brush core packs 62 include bristles 66 having a stiffer or thicker diameter filaments than bristles 68 of core packs 64.

While the invention has been described in terms of various specific embodiments, those skilled in the art will recognize that the invention can be practiced with modification within the spirit and scope of the claims.

What is claimed is:

1. A brush seal assembly comprising:
   an elongate brush core holder;
   at least three elongate brush core packs bundled together side-by-side in a staggered arrangement in said brush core holder forming a single assembly; each said brush core pack comprising:
   a bristle holder; and
   a plurality of bristles coupled to said bristle holder.

2. A brush seal assembly in accordance with claim 1 wherein said plurality of bristles comprise at least one of textile yarn filaments, plastic filaments, ceramic filaments, carbon fiber filaments, and woven cloth.

3. A brush seal assembly in accordance with claim 1 comprising a width of about 0.05 inch to about 1.0 inch.

4. A brush seal assembly in accordance with claim 1 comprising a width of about 0.05 inch to about 0.8 inch.

5. A brush seal assembly in accordance with claim 1 comprising a width of about 0.05 inch to about 0.1 inch.

6. A brush seal assembly in accordance with claim 1 wherein a brush core pack positioned at said first side of said brush core holder and said brush a brush core pack positioned at a second side of said core holder comprise a plurality of bristles formed from a first material, and each said brush core pack positioned between said brush core packs positioned at said first and second side of said brush core holder comprises a plurality of bristles formed from a second material.

7. A brush seal assembly in accordance with claim 1 wherein a brush core pack positioned at said first side of said brush core holder and a brush core pack positioned at a second side of said core holder comprise a plurality of bristles that are stiffer than said plurality of bristles of each said brush core pack positioned between said brush core packs positioned at said first and second side of said brush core holder.

8. A brush seal assembly in accordance with claim 1 wherein a brush core pack positioned at said first side of said brush core holder and a brush core pack positioned at a second side of said core holder comprise a plurality of bristles having a larger diameter than said plurality of bristles of each said brush core pack positioned between said brush core packs positioned at said first and second side of said brush core holder.

9. A brush seal assembly in accordance with claim 1 wherein each said brush core pack comprises a plurality of bristles that are formed from a material that is different than the material of said plurality of bristles of an immediately adjacent brush core pack.

10. A brush seal assembly in accordance with claim 1 wherein said plurality of brush core packs comprise a plurality of first brush core packs and a plurality of second brush core packs, said first brush core packs comprising bristles having a larger diameter than said bristles of said plurality of second brush core packs.

11. A brush seal assembly in accordance with claim 10 wherein said plurality of core packs are arranged in an alternating arrangement with a first brush core pack adjacent to a second brush core pack.

12. A rotary machine comprising:

a rotor having a longitudinal axis;

a plurality of stator casing segments circumferentially arrayed together to define a stator casing which is generally coaxially aligned with said longitudinal axis and which circumferentially surrounds and is radially spaced apart from said rotor; and at least one brush seal assembly comprising:
an elongate brush core holder;
at least three elongate brush core packs bundled together side-by-side in a staggered arrangement in said brush core holder forming a single assembly; each said brush core pack comprising:
a bristle holder; and
a plurality of bristles coupled to said bristle holder.

13. A rotary machine in accordance with claim 12 wherein said plurality of bristles comprise at least one of textile yarn filaments, plastic filaments, ceramic filaments, carbon fiber filaments, and woven cloth.

14. A rotary machine in accordance with claim 12 wherein said brush seal assembly comprises a width of about 0.05 inch to about 1.0 inch.

15. A rotary machine in accordance with claim 12 wherein said brush seal assembly comprises a width of about 0.05 inch to about 0.5 inch.

16. A rotary machine in accordance with claim 12 wherein said brush seal assembly comprises a width of about 0.05 inch to about 0.1 inch.

17. A rotary machine in accordance with claim 12 wherein a brush core pack positioned at said first side of said brush core holder and a brush core pack positioned at a second side of said core holder comprise a plurality of bristles formed from a first material, and each said brush core pack positioned between said brush core packs positioned at said first and second side of said brush core holder comprises a plurality of bristles formed from a second material.

18. A rotary machine in accordance with claim 12 wherein a brush core pack positioned at said first side of said brush core holder and a brush core pack positioned at a second side of said core holder comprise a plurality of bristles that are stiffer than said plurality of bristles of each said brush core pack positioned between said brush core packs positioned at said first and second side of said brush core holder.

19. A rotary machine in accordance with claim 12 wherein a brush core pack positioned at said first side of said brush core holder and a brush core pack positioned at a second side of said core holder comprise a plurality of bristles having a larger diameter than said plurality of bristles of each said brush core pack positioned between said brush core packs positioned at said first and second side of said brush core holder.

20. A rotary machine in accordance with claim 12 wherein each said brush core pack comprises a plurality of bristles that are formed from a material that is different than the material of said plurality of bristles of an immediately adjacent brush core pack.

21. A rotary machine in accordance with claim 12 wherein said plurality of brush core packs comprise a plurality of first brush core packs and a plurality of second brush core packs, said first brush core packs comprising bristles having a larger diameter than said bristles of said plurality of second brush core packs.

22. A rotary machine in accordance with claim 21 wherein said plurality of core packs are arranged in an alternating arrangement with a first brush core pack adjacent to a second brush core pack.

23. A brush seal assembly comprising:

an elongate brush core holder; and a plurality of brush core packs bundled together side-by-side in said brush core holder; said plurality of brush core packs comprising a plurality of first brush core packs and a plurality of second brush core packs, said first brush core packs comprising bristles having a first length, said second brush core packs including bristles comprising a second length that is longer than said first length, each said brush core pack further comprising:
a bristle holder; and
a plurality of bristles coupled to said bristle holder.

24. A brush seal assembly in accordance with claim 23 wherein a brush core pack positioned at said first side of said brush core holder and said brush a brush core pack positioned at a second side of said core holder comprise a plurality of bristles that are stiffer than said plurality of bristles of each said brush core pack positioned between said brush core packs positioned at said first and second side of said brush core holder.

25. A brush seal assembly in accordance with claim 23 wherein a brush core pack positioned at said first side of said brush core holder and said brush a brush core pack positioned at a second side of said core holder comprise a plurality of bristles having a larger diameter than said plurality of bristles of each said brush core pack positioned between said brush core packs positioned at said first and second side of said brush core holder.

26. A brush seal assembly in accordance with claim 23 wherein each said brush core pack comprises a plurality of bristles that are formed from a material that is different than the material of said plurality of bristles of an immediately adjacent brush core pack.

27. A brush seal assembly in accordance with claim 23 wherein said plurality of brush core packs comprise a plurality of first brush core packs and a plurality of second brush core packs, said first brush core packs comprising bristles having a larger diameter than said bristles of said plurality of second brush core packs.

28. A brush seal assembly in accordance with claim 27 wherein said plurality of core packs are arranged in an alternating arrangement with a first brush core pack adjacent to a second brush core pack.

* * * * *